United States Patent [19]

Lindgren

[11] 4,378,652
[45] Apr. 5, 1983

[54] MOTOR DRIVEN FISHING REEL

[76] Inventor: Peter B. Lindgren, 2700 NE. 7th Ave., Pompano Beach, Fla. 33064

[21] Appl. No.: 180,813

[22] Filed: Aug. 25, 1980

[51] Int. Cl.³ .......................................... A01K 89/017
[52] U.S. Cl. ...................................... 43/26.1; 43/15; 43/21
[58] Field of Search ..................... 43/15, 16, 21, 26.1, 43/4; 254/267

[56] References Cited

U.S. PATENT DOCUMENTS

| | | | |
|---|---|---|---|
| 2,735,207 | 2/1956 | Christiansen | 43/15 |
| 3,189,196 | 6/1965 | Carl | 254/267 |
| 3,365,833 | 1/1968 | Christiansen | 43/15 |
| 3,696,545 | 10/1972 | Gudjonsson | 43/15 |
| 3,841,605 | 10/1974 | Joraku | 254/267 |
| 3,922,808 | 12/1975 | Rieth | 43/4 |
| 4,253,165 | 2/1981 | Christiansen | 43/26.1 |
| 4,344,587 | 8/1982 | Hildreth | 43/26.1 X |

Primary Examiner—Nicholas P. Godici
Assistant Examiner—Charles L. Willis

[57] ABSTRACT

A motor driven fishing reel having control means so that when a selected minimum speed of unwinding rotation is reached by the pull of the fish a switch is actuated causing the reel to rewind.

1 Claim, 8 Drawing Figures

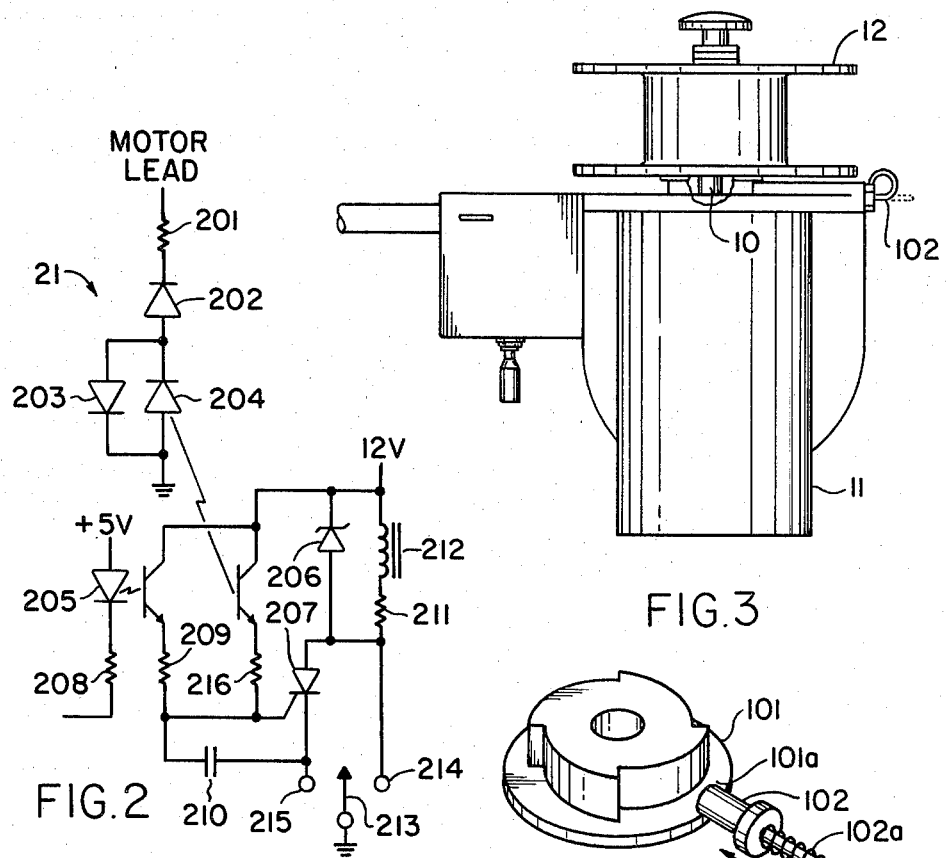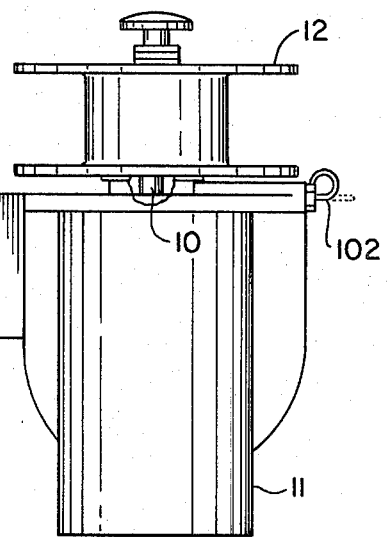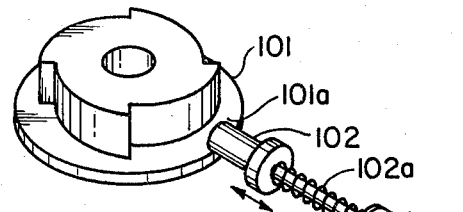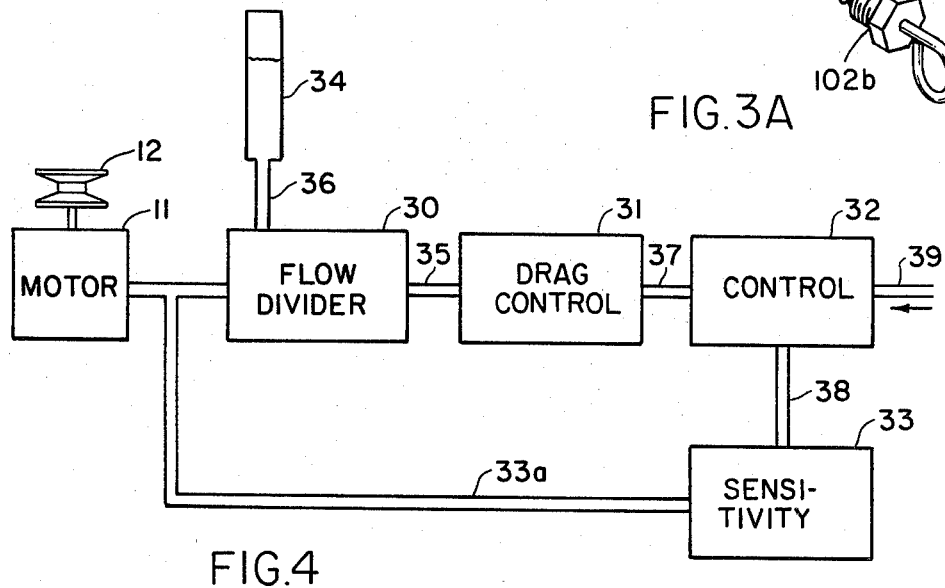

MOTOR DRIVEN FISHING REEL

BACKGROUND OF INVENTION

This invention relates to a motor-driven fishing reel. In particular it relates to a motor-driven fishing reel used in bottom or intermediate depth fishing.

Motor-driven fishing reels have been described in the past and are exemplified by U.S. Pat. Nos. 2,462,974, 2,896,875, 3,030,046, 3,215,359, 3,248,819, 3,351,300, 3,459,387, 3,544,030, 4,021,003, 4,026,493. However, all such prior art devices require manual control at all times.

One object of the present invention is to provide a motor-driven fishing reel which will automatically wind up the fishing line when the fish has bitten the bait on the hook.

Other objects and advantages of this invention will be apparent from the description and claims which follow, taken together with the appended drawings.

SUMMARY OF INVENTION

The invention comprises broadly a spool having a fishing line wound on it, motor means for rotating said spool so as to normally wind the line up on the spool, power means for said motor means, switch means for causing said power means to actuate said motor means, and control means which respond to a minimum speed of unwinding of the fishing line to actuate the switch means, thus automatically causing the motor to rotate the spool to cause the fishing line to be fully rewound on the spool.

In one embodiment of this invention, an electric motor drive is coupled directly to the spool. The motor preferably is a low speed DC permanent magnet drive not requiring any speed reduction. The motor preferably operates at an input voltage with sufficient internal electrical resistance or impedance so as to avoid damage or heating even if the load of the fish is powerful enough to stop the spool and even pull it into reverse rotation for short periods of time unitl the fish is finally overcome and retrieved. No friction drag or slip system is required as in the prior art. The motor has the ability to generate current at very low armature speeds. The invention employs a circuit to sense this current as a fish pulls on the line causing the spool and armature to turn. This current is detected and actuates the switch which turns on the motor and retrieves the fish. The motor circuit is controllable so as to select the minimum speed in accordance with the size of the fish and hence it is pulled. Also, the current pulsations during letting down and retrieving of a line can be used as signals for an electronic depth counter.

In another embodiment of this invention a fluid motor such as a hydraulic motor with assorted fluid circuitry can be used. Suitable hydraulic motors include gear type, vane type and geroter types. A significant pull by a fish, when it exceeds a predetermined minimum pressure, will cause a valve to open and thus operate the motor until the reel is completely rewound. The motor can be rotated freely to let out the line and hence can be reversible. Slave valves are preferred for the automatic mode and various safety and normal control features are included such as relief valves and mode selection.

In a preferred embodiment using an electric motor, a motor relay is actuable by a low current, solid state circuit whose signal current is generated by the reverse turning of the motor. An additional feature is the use of counters wherein a magnet on the spool rotates against a pair of Hall effect pick-ups which sense the timing and direction of the rotation of the spool and feed the information to a counter assembly wherein it is compared with a predetermined counter and can actuate the motor relay. Yet another feature of this embodiment is the inclusion of circuitry which will permit momentary actuation of the motor on a predetermined basis so as to shake the bait and hook.

BRIEF DESCRIPTION OF DRAWINGS

FIG. 2 is a schematic diagram of a bite detector.

FIG. 3 is a view of the assembly of the reel and motor.

FIG. 3A is an exploded view of a portion of FIG. 3.

FIG. 4 is a flow chart of a hydraulic version of this invention.

SPECIFIC EXAMPLES OF INVENTION

Figure 1:
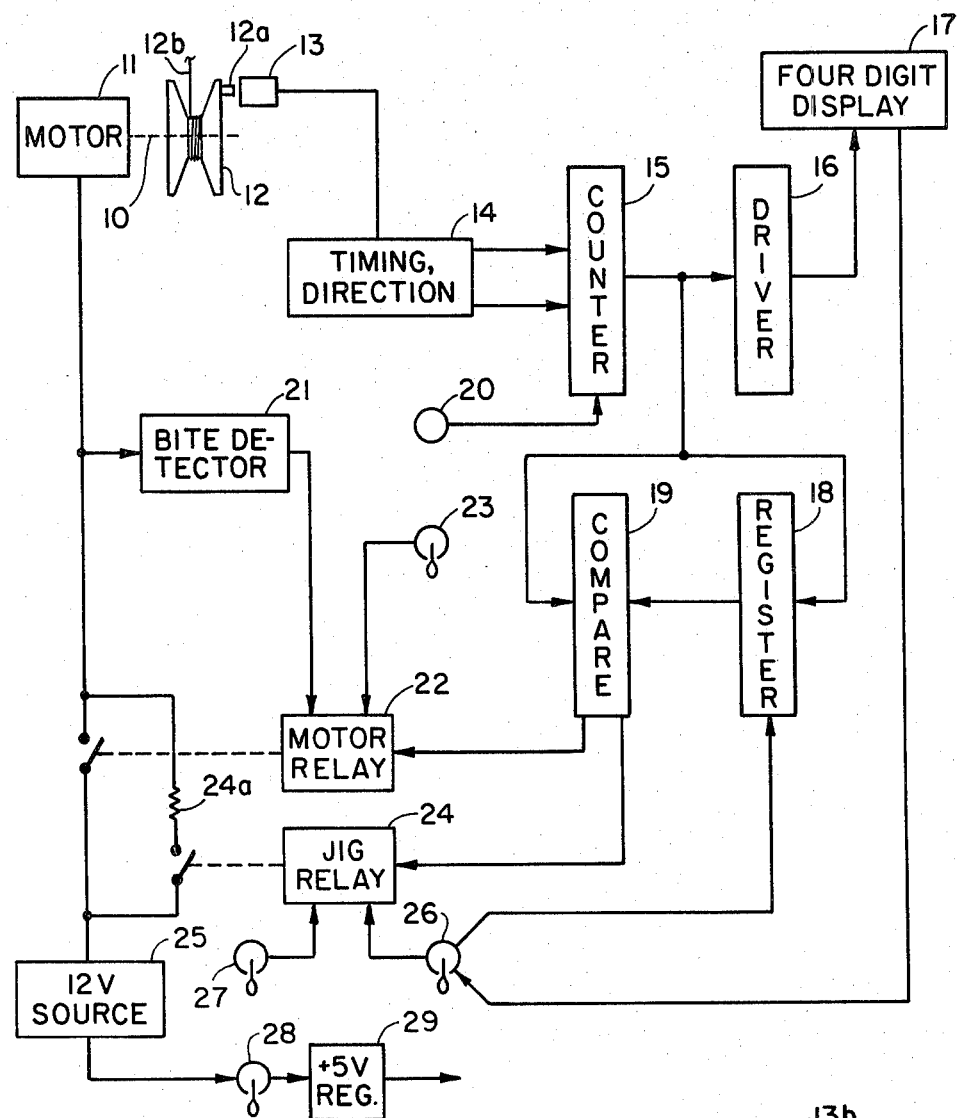
FIG. 1 is a block diagram of an embodiment of this invention using an electric motor.
Figure 1A:
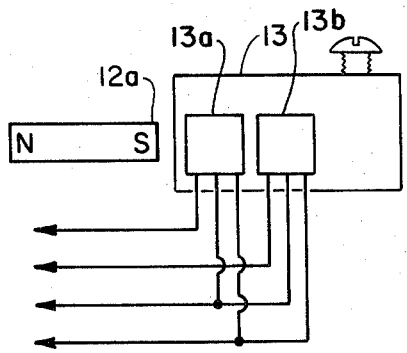
FIG. 1A is a more detailed diagram of a portion of FIG. 1.

Referring now to FIGS. 1, 1A, 2, 3, 3A and 6, an electric motor 11, preferably a low-speed DC, permanent magnet drive motor not requiring any speed reduction, is connected to the shaft 10 of spool 12 on which a fishing line 12b is wound. Mounted on the edge of one face of spool 12 is a magnet 12a. As the spool rotates the magnet passes close to a pair of Hall effect pick-ups 13a and 13b mounted on support 13. The pick-ups sense the timing and direction of rotation of the spool 12 and feed the information to data processing equipment wherein the timing and direction information is transformed in block 14 so as to be measured by counter 15 which makes a comparison in conjunction with registration unit 18 and compare unit 19 as well as feeding a signal through driver 16 through four digit display 17.

The counting of the spool rotation is primarily used to determine when the jig relay 24 is to be actuated. As soon as a predetermined play out of the line has been accomplished as read by the computer and its components the jig relay, which has a built-in timer, turns on the motor at part power through resistance 24a. Timer 27 is adjustable for the jig time as for example, short, medium or long and generally is set in the range of one to four seconds.

A key feature of the invention is the bite detector 21 which activates motor relay 22 to connect 12 v source 25 to the motor when the speed of reverse rotation of the motor 11 sends sufficient voltage to the bite detector. The motor 11 then rewinds the line 12b onto spool 12 and then stops. The bite detector is controlled by a single-pole double throw switch 213. The bite detector circuit comprises a resistor 201 connected to the motor connected through diode 202 to diode 203 and opto-isolator 204 which connects to Zener diode 206 and motor relay 212 and through resistor 216 to SCR 207 and through resistors 216 and 209 to opto-isolator 205.

Figure 6:
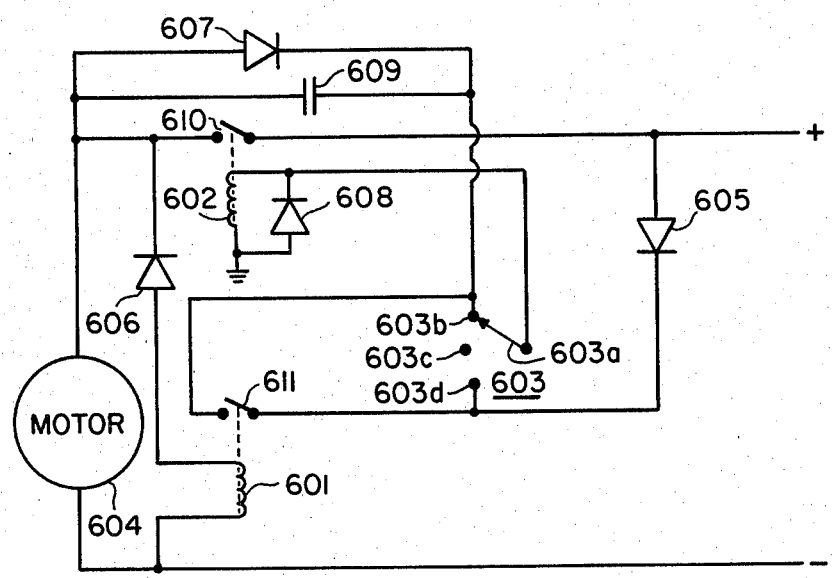
FIG. 6 is a schematic diagram of the sensing circuit for an electric motor.

As illustrated in FIG. 6 a single-pole double throw switch 603 connects the motor relay 602 and its switch 610 through two routes. One route is through capacitor 609 and parallel with diode 607. The other route is through diode 605 and relay 601 with associated switch 611.

Gear 101, mounted on the motor shaft 10 has outside teeth or "dogs" 101a which when connected with spring-loaded manually-operated pin 102 prevent the line from moving. When the pin 102 is not connected the line is free to be played out. It is customary to play out a fishing line for a predetermined distance initially before actuating the device of this invention.

Figure 5:
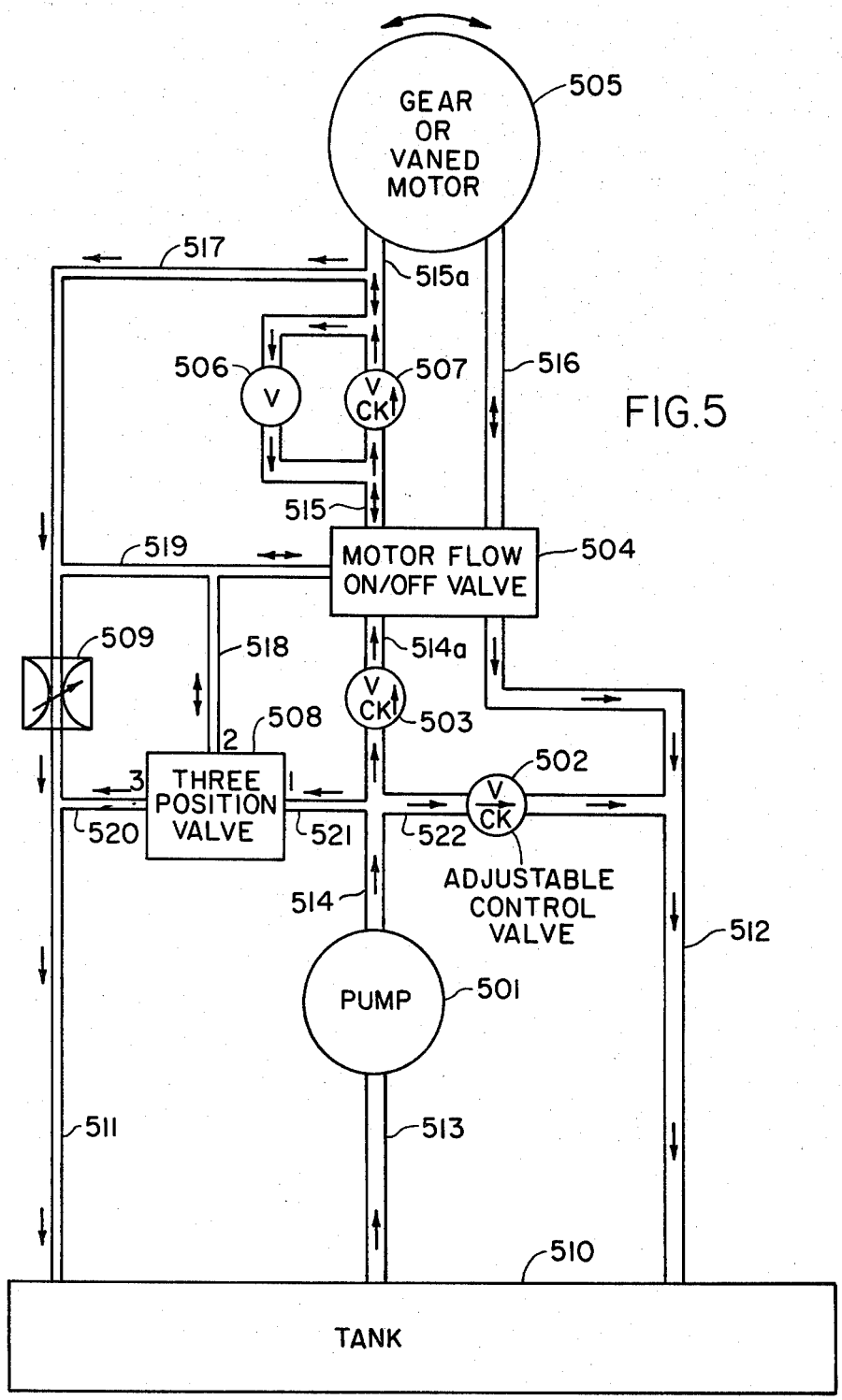
FIG. 5 is a circuit diagram of a hydraulic version.

In the fluid motor model illustrated in FIGS. 4 and 5 fluid, such as hydraulic fluid, is drawn from tank 510 through conduit 513 to pump 501. The flow from the pump through conduit 514 flows directly flows directly to check valve 503, through conduit 522 to adjustable control valve 502 and through conduit 521 to three position valve 508.

Control valve 502 blocks flow from the pump back to the tank through conduit 512 until the pressure created from a load on the motor 505 reaches the control valve setting. It will then permit fluid to go into the tank thus acting as a maximum torque setting device or drag control for the motor, in addition to being a high pressure safety.

Check valve 503 permits fluid from the pump 501 to go to the motor flow on-off valve 504 but creates a sufficient back pressure for hydraulic control via the three-position valve 508 and the motor feed back curcuit.

Motor flow valve 504 is a pilot operated valve i.e. a hydraulic controlled hydraulic valve. It is a spring-return normally-off valve where in the off position free flow is allowed from the motor 505 and the pressure and exhaust ports. When pressure is applied to the pilot port, motor valve 504 will move to the on position opening the pressure port to the correct motor port for motor rotation and the second motor port is open to the exhaust port, so that the motor runs.

Motor 505 may be a gear vane or gerotor type that both drives and pumps.

Valve 506 is an on-off valve which would open and the motor off allows for free rotation of the motor for letting the line out.

Check valve 507 allows for free flow for motor flow valve 504 to the motor 505 when the valve 504 is in on position, but prevents flow in the opposite direction.

A metering orifice 509 is provided which allows a small amount of flow from motor 505 through conduits 517 and 511 to the tank 510. Above a predetermined flow sufficient back pressure will be created to turn on motor flow valve 504 for automatic operation.

In general terms as illustrated in FIG. 4, a fluid motor 11 is operable on spool 12. Fluid from the tank enters a control 32 through conduit 39.

With respect to this hydraulic version, a pull on the line and hence on the hydraulic motor 505 causes the motor to pump. Valve 506 is open to let the line out. Valve 503 is a check valve which has its back pressure set.

The motor flow valve 504 operates on the hydraulic motor 505 to either turn it on or turn it off. All ports are open when the motor is in the off position.

There is a three-position valve 508. When port number one connected to conduit 521 is closed and ports 2 and 3 connected to conduits 518 and 520 are open the valve is essentially in off position ports 2 and 3 serving primarily as bleeders. If ports 1 and 2 are open so that conduits 518 and 521 are interconnected and port 3 closed so that conduit 520 is blocked, the system is in the manual on position with the motor 505 operating to haul up the line.

When all three ports 1, 2 and 3 are closed so that conduits 518, 520 and 521 are blocked, the pump 501 cannot actuate the hydraulic motor 505 until a sufficient drag or reverse pumping occurs on hydraulic motor 505. When this reverse pumping occurs, there is flow through conduit 519 so as to turn on the motor flow valve 504.

Variable orifice 509 is manually adjustable while check valve 502 is in effect a high pressure safety valve which can be set for example, at 1,000 pounds per square inch.

In the flow diagram FIG. 4 control 32 is represented on FIG. 5 by components 502, 504, 508 and 509 together with associated conduits. Adjustable control valve 502 is an example of drag control 31. The flow divider 30 samples the flow and displays it in a reading reservoir 34. Sensitivity 33 is exemplified by variable orifice 509.

I claim:
1. A fishing device comprising:
   (a) A spool having a shaft;
   (b) a fishing line windable on said spool;
   (c) electric power means;
   (d) electric motor means which when connected to said power means rotates said spool shaft so as to rewind said fishing line on to said spool but which when unconnected is rotated by the unwinding of the fishing line in the reverse direction so as to generate an electric current;
   (e) first switch means for connecting said power means to said motor means; and
   (f) second switch means actuable by a predetermined minimum voltage of said generated current so as to actuate said first switch means, causing said electric motor means to reverse and rewind said fishing line on said spool.

* * * * *